T. J. Alexander,
Circular Saw Mill.

Nº 17,860.　　　　　　　Patented July 28, 1857.

UNITED STATES PATENT OFFICE.

THOS. J. ALEXANDER, OF WESTERVILLE, OHIO.

FEEDING ARRANGEMENT FOR SAWING-MACHINES.

Specification of Letters Patent No. 17,860, dated July 28, 1857.

*To all whom it may concern:*

Be it known that I, THOS. J. ALEXANDER, of Westerville, in the county of Franklin and State of Ohio, have invented a certain new and useful Improvement in Feeding Arrangements of or to Circular and other Saws or Cutters, of which the following is a full, clear, and exact description, reference being had to the accompanying drawing, which forms part of this specification, and in which—

Figure 1:
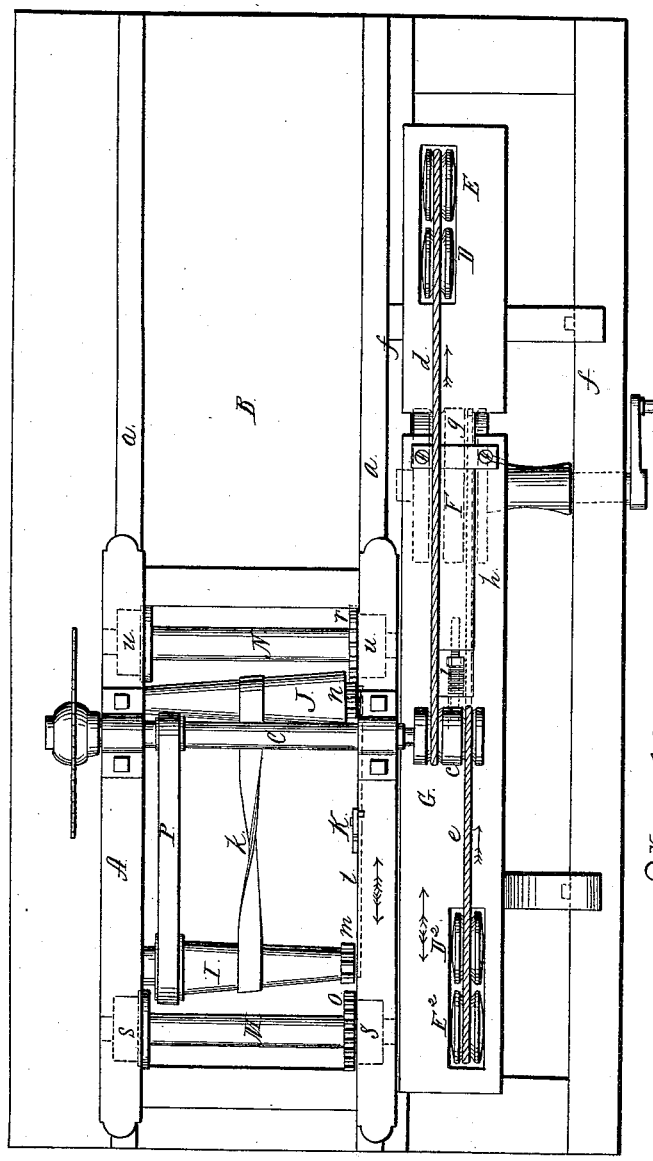
Figure 2:
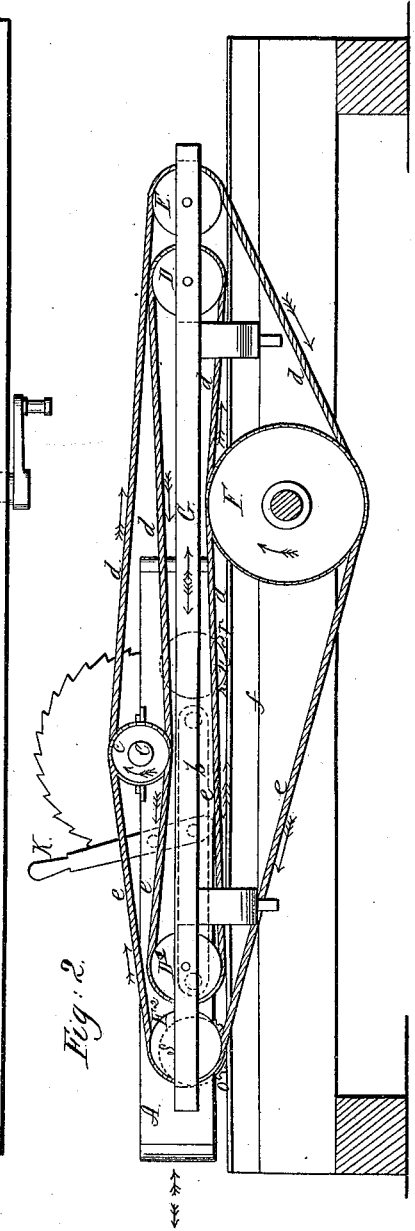

Figure 1 represents a top view or plan, and Fig. 2 a longitudinal vertical section.

In the arrangement represented in the accompanying drawing the feed of the stuff to be cut or of a revolving cutter to and through the stuff is effected by means of a reciprocating carriage (A) operated in a novel manner as follows: The carriage, which travels to and fro on and along rails ($a$ $a$) of a table (B), is fitted with a cross shaft (C) that carries on one of its ends a pulley ($c$) reciprocating with the carriage. This pulley ($c$) is revolved by belts ($d$ $e$) arranged to pass around opposite sides of said pulley so as to pull upon its shaft (C) in opposite directions to counteract one sided pull or strain. These belts are distinct and endless. The one of these belts ($d$) passes to the right and the other one ($e$) to the left, the one line or length of each belt passing around inner loose pulleys (D $D^1$) and the other line or length of said belts around outer loose pulleys (E $E^1$), and the two lines or lengths of each belt from thence continued to encircle on opposite sides a stationary revolving counter or main driving pulley (F) that may be kept in motion by any suitable means. The loose pulleys (D $D^1$ and E $E^1$) are hung at any suitable distance apart, that is either pair of inner and outer pulleys, in a self adjusting or freely sliding carrying frame (G) which reciprocates, parallel to the reciprocating travel of the carriage, on ways ($f$ $f$). This carrying frame (G) may either be entire and rigid or it may be divided between the two pairs of loose pulleys (as shown in Fig. 1) and, where divided, provided with a tongue ($g$) and jaw ($h$) and adjusting nut, screw and spring ($i$) arranged to induce a thrust of the divided portions of said carrying frame apart to serve the purpose of self tightening the two belts ($d$ $e$). The reciprocating feed of the cutter, or log, carriage (A), as the case may be, is produced by thus giving to the main feed motion of the pulleys ($c$) on the cross shaft (C) a revolving force free to reciprocate with the carriage, which draws the loose pulley frame (G) along with it though at a different velocity, and that admits of a pause at any point to the reciprocating travel of the carriage to meet difficulties in the cut, without stopping the main motion or run of the belts ($d$ $e$) and revolving movement of the main feed shaft (C) and that insures, by the freely sliding or self adjusting loose pulley frame (G), the equal pull of the belts ($d$ $e$), backward or forward, on the reciprocating carriage whether moving or at rest, any extra tension of the one belt readily communicating itself and establishing an equality with the other by the freedom of the carrying frame (G) to slide lengthwise. The carriage (A), thus provided with a revolving power free to reciprocate with the carriage, and derived from a stationary revolving power, with the facilities and advantages just named, may be propelled as follows: Across the carriage I arrange two cone drums (I, J) parallel to each other but tapering in reverse directions. These cone pulleys are connected by a crossed belt ($k$), and have fixed bearings on the one side of the carriage frame but rotate on the other side in a sliding piece ($l$) which is thrown backward or forward by means of a lever (K) to engage one or other of two pinions ($m$, $n$) on the ends of the cones, with either one of two pinious ($o$ $r$) on the axles (M N) of the carriage, for the purpose of giving motion to the carriage backward or forward as required, accordingly as which axle (M or N) is driven by its adjoining cone in opposite directions, by means of the truck wheels ($s$ $s$ or $u$ $u$) of the carriage biting on the rails ($a$ $a$), power being communicated to the one cone (I) by belt (P) from the main feed shaft (C). By disengaging both cones from gear with the axles (M or N) altogether, by partially moving the hand lever (K), then is the reciprocating travel of the carriage arrested though the feed works continue to revolve, and by varying the position of the connecting belt on the cones is the velocity of the "feed" changed though the velocity of the main revolving power of the cross shaft (C) remains the same.

The top of the carriage (A) may be planked over so as to conceal the feed gear, also to serve for the attendant to ride on to work the handle (K) and attend generally to the work, and, if the feed be effected by the saw or cutter moving along with the carriage, it also may serve as a table for the stuff as cut to fall on and on the back movement of the carriage to be conveyed where it may be readily slipped off out of the way previous to taking a new cut or forward stroke.

If the feed be that of a revolving cutter moving along with the carriage, and the stuff being cut be stationary or moved in a reverse direction simultaneously with the reciprocating action of the revolving saw or cutter, then, as shown in the accompanying drawing, the same cross shaft (C), deriving its motion as described and actuating the feed or reciprocating travel of the carriage in manner set forth, may form also the revolving saw or cutter shaft. But the feed may not be effected by moving the saw or cutter in this way, but by having the saw operated by any suitable power distinct from the carriage, the carriage (A) may simply serve to carry or feed up the log, say, against the saw, and, in this case the cross shaft (C) of the carriage with its pertaining gear or driving and driven appliances would, in combination with the reciprocating carriage, be merely a feed gear or arrangement, and not a revolving or driving one as well to the saw or cutter.

The feed works in or immediately connected with the reciprocating carriage may, of course, be more or less modified at pleasure, so long as the carriage is propelled, to effect the feed, by the main feed shaft (C) driven by the right and left hand belts (d e) of the free to play or self adjusting pulley frame (G) made whole or divided and rigid or self stretching as preferred; thus, a connecting gear might be used between the carriage and main feed shaft (C), to propel the carriage, not necessitating the reciprocating traverse of said shaft and the self adjusting belt frame (G) with the carriage.

What I claim as new and useful herein, and desire to secure by Letters Patent, is:

The combination and arrangement with a reciprocating feed carriage (A); as a means of operating the same to effect the reciprocating travel or feed, by propelling gear therein or connected therewith operated by or from a main feed shaft (C); of the freely sliding or self adjusting pulley frame (G) with its right and left hand belts (d e) driven and communicating motion to the main feed shaft (C) essentially as set forth for the purposes specified.

In testimony whereof, I have hereunto subscribed my name.

THOS. J. ALEXANDER.

Witnesses:
EZRA MUNSON,
JAMES WESTERVELT.